(12) United States Patent
Stephen et al.

(10) Patent No.: US 9,809,432 B2
(45) Date of Patent: Nov. 7, 2017

(54) HUMAN-POWERED PALLET CARRIER

(71) Applicants: Jeffrey Joseph Stephen, Victoria (CA); Benj Birch, Victoria (CA); Stephen Hutton Ferguson, Victoria (CA); Adam Revitt, Victoria (CA); Max-Cedric Entz-von Zerssen, Bremen (DE); Nathaniel Martin, Vancouver (CA); Trevor Keegan Duncan Bartlett, Victoria (CA); Joseph Ferguson, Shawnigan Lake (CA)

(72) Inventors: Jeffrey Joseph Stephen, Victoria (CA); Benj Birch, Victoria (CA); Stephen Hutton Ferguson, Victoria (CA); Adam Revitt, Victoria (CA); Max-Cedric Entz-von Zerssen, Bremen (DE); Nathaniel Martin, Vancouver (CA); Trevor Keegan Duncan Bartlett, Victoria (CA); Joseph Ferguson, Shawnigan Lake (CA)

( * ) Notice: Subject to any disclaimer, the term of this patent is extended or adjusted under 35 U.S.C. 154(b) by 0 days.

(21) Appl. No.: 14/854,599

(22) Filed: Sep. 15, 2015

(65) Prior Publication Data

US 2016/0075541 A1    Mar. 17, 2016

Related U.S. Application Data

(60) Provisional application No. 62/050,604, filed on Sep. 15, 2014.

(51) Int. Cl.
*B60P 3/00*    (2006.01)
*B66F 9/065*    (2006.01)
(Continued)

(52) U.S. Cl.
CPC ............... *B66F 9/065* (2013.01); *B62K 5/05* (2013.01); *B62K 7/04* (2013.01); *B62M 1/36* (2013.01);
(Continued)

(58) Field of Classification Search
CPC .......... B62K 5/05; B65K 7/04; B62B 5/0083; B62B 2203/10; B62B 2203/20; B62D 63/067; B65D 19/42
(Continued)

(56) References Cited

U.S. PATENT DOCUMENTS 1,465,435 A * 8/1923 Higgins ................... B62K 5/00 280/202
2,375,720 A * 5/1945 Wood .................... B62B 5/0083 16/34
(Continued)

*Primary Examiner* — Anna Momper
*Assistant Examiner* — Mark Hageman
(74) *Attorney, Agent, or Firm* — Baumgartner Patent Law; Marc Baumgartner

(57) ABSTRACT

A self-loading, human-powered pallet carrier is provided, the pallet carrier comprising: a first frame; a second frame; a drive train; a handlebar; a seat; and a braking system, one of the first frame or the second frame supported by a pair of driving wheels, the other of the first frame or the second frame supported by an at least one driving wheel, one of the pair of driving wheels or the single driving wheel pivotally mounted to the second frame with an at least one actuator, the other of the pair of driving wheels or the single driving wheel directly mounted to the first frame with an at least one actuator, the first frame including a pair of pallet forks, the second frame including a pair of beams, which, when mated, form a pallet loading zone, each pallet fork and each beam having an at least one dolly wheel, the drive train, the handlebar, the seat and the braking system mounted on the first frame. A method of using the self-loading pallet carrier is also provided.

18 Claims, 7 Drawing Sheets

(51) Int. Cl.
*B62M 6/70* (2010.01)
*B66F 9/075* (2006.01)
*B62M 1/36* (2013.01)
*B62K 5/05* (2013.01)
*B62K 7/04* (2006.01)
*B62B 5/00* (2006.01)

(52) U.S. Cl.
CPC ........... *B62M 6/70* (2013.01); *B66F 9/07509* (2013.01); *B66F 9/07572* (2013.01); *B62B 5/0083* (2013.01); *B62B 2203/10* (2013.01)

(58) Field of Classification Search
USPC ..... 414/458, 471, 476; 280/43, 43.12, 43.17
See application file for complete search history.

(56) References Cited

U.S. PATENT DOCUMENTS

| | | | | |
|---|---|---|---|---|
| 2,729,196 A * | 1/1956 | Breitenbach | ......... | A01K 1/0613 119/512 |
| 3,243,193 A * | 3/1966 | Bivins | ....................... | B60P 7/13 254/45 |
| 3,672,634 A * | 6/1972 | Chaffin | ..................... | B62B 1/14 254/2 C |
| 4,913,614 A * | 4/1990 | O'Rarden | ................. | B62B 3/10 187/244 |
| 5,018,930 A * | 5/1991 | Hardin | .................. | B62B 5/0083 254/8 R |
| 5,171,034 A * | 12/1992 | Scott | ..................... | B62D 63/067 280/2 |
| 5,427,396 A * | 6/1995 | Gore | .................... | B62K 27/006 224/320 |
| 5,435,471 A | 7/1995 | Chuang | | |
| 8,814,193 B2 * | 8/2014 | Barnes | ................... | B62K 27/12 280/204 |
| 2005/0254927 A1* | 11/2005 | Swetman | ............... | B60P 1/5409 414/542 |
| 2013/0214503 A1* | 8/2013 | Chiuppani | ............. | B60G 5/025 280/124.103 |

* cited by examiner

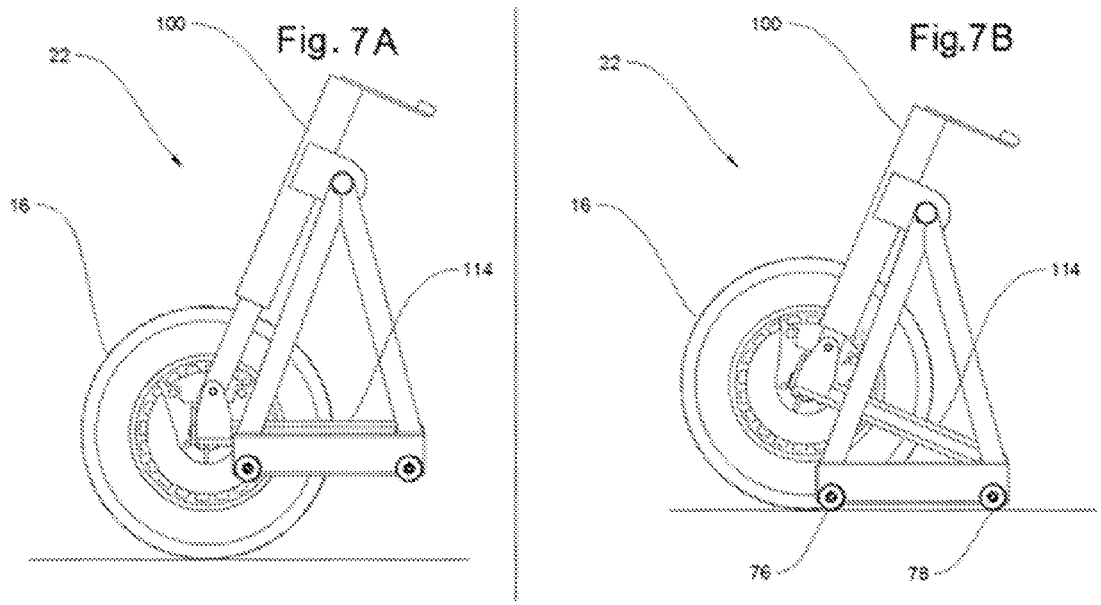
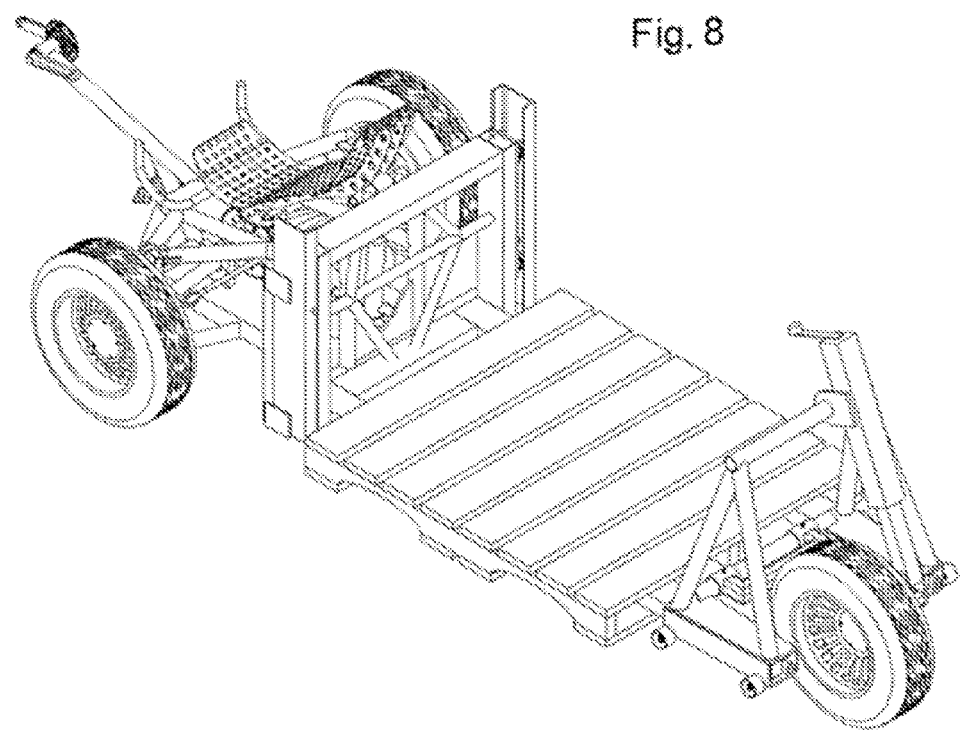

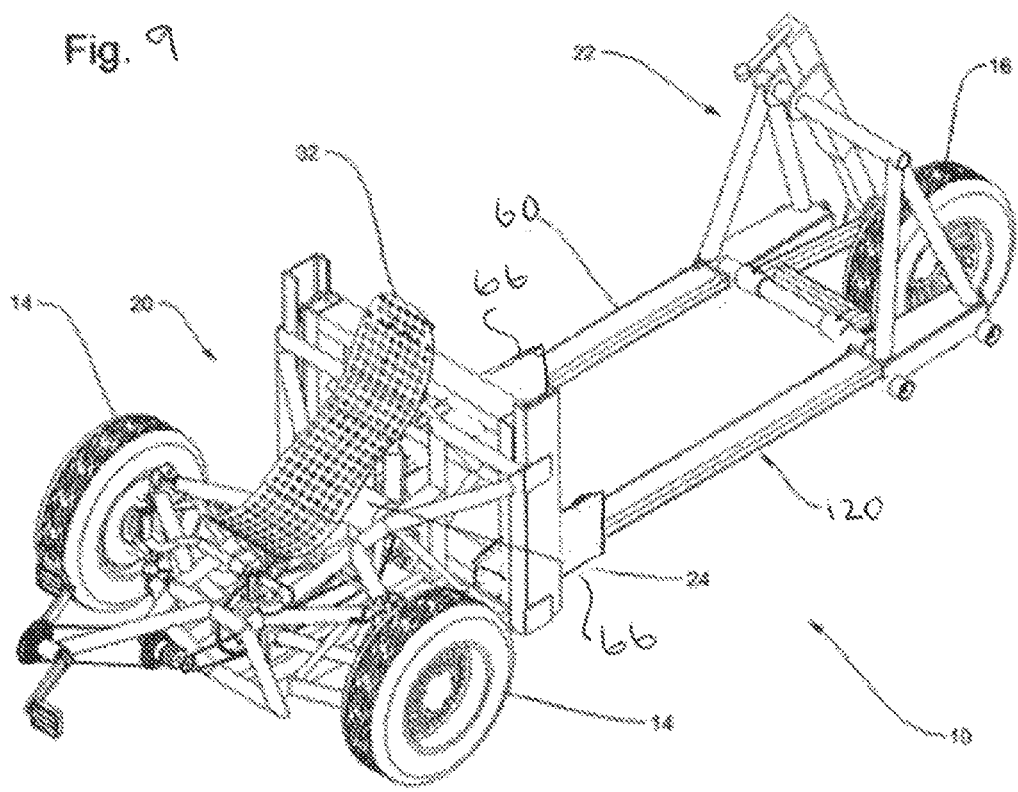

HUMAN-POWERED PALLET CARRIER

RELATED APPLICATIONS

This application claims the benefit of U.S. Patent Application Ser. No. 62/050,604, filed on 15 Sep. 2014. The entire contents of each of the above-identified prior applications are hereby incorporated by reference.

FIELD

The present technology is a human-powered tricycle that carries pallets. More specifically, it is a self-loading pallet carrier that is pedal driven and conforms to the standards defining a motor-assisted cycle.

BACKGROUND

There are many different means of transporting and delivering goods within cities. In North America, most large deliveries are made with trucks, with pedal power only used for small packages. In other countries, bicycles are used to make deliveries. In some cases, the bicycles have platforms and carriers that allow for large loads to be bound and transported. The weight of these loads is usually not great, as the bicycles have standard frames that cannot withstand heavy loads.

Panniers can also be used to transport goods. U.S. Pat. No. 5,435,471 discloses an article carrier that includes a beam fixed to an article, such as a pannier for attaching the article to a bicycle. Two hooks are secured to the beam for hooking to the bicycle. A base is fixed on the beam and has a track fixed on the top. A slide is slidably engaged on the track and has a retainer secured on the top for engaging with the bicycle so as to solidly secure the beam to the bicycle. These article carriers are not suitable for large or heavy loads. The bicycles are similarly not designed for heavy loads.

Goods can also be transported using bicycle trailers. One such trailer is disclosed in U.S. Pat. No. 8,814,193. The trailer is designed such that when the trailer is decoupled from the bicycle, the trailer can stand without tipping over. Additionally, the coupling assembly used for coupling the trailer to the bicycle, together with the handle assembly, can collectively pivot about the trailer frame to permit the trailer to be easily maneuvered by the rider once the trailer has been decoupled from the bicycle. Bicycle trailers are limited in the load size and weight that can be carried. They are also rather unwieldy to maneuver.

Many articles are delivered on pallets. These are loaded into trucks with a combination of fork lifts and hydraulic tailgates. If they are to be unloaded as pallets, again, hydraulic tailgates and forklifts are employed. If only the articles are to be removed, then this can be done manually. However, it is required that a truck be driven from site to site, parked, and unloaded. The delivery vehicles are large, difficult to maneuver on tight city streets and cause pollution. Further, these vehicles are subject to parking restrictions, often resulting in the driver receiving hefty fines.

What is needed is a human-powered means of moving pallets. It would be advantageous if such a device could be classified as a bicycle or tricycle, travel on bike lanes, and not be subjected to the parking restrictions imposed on delivery vehicles. It would be a further advantage if the device was self-loading and self-unloading, as this would remove the requirement for a forklift.

SUMMARY

The present technology provides a "green" solution to the problems associated with delivering pallet loads of articles within a city. In one embodiment, it is human-powered means of moving pallets. It is classified as a bicycle or tricycle, travels on bike lanes, and is not be subjected to the parking restrictions imposed on delivery vehicles. It is self-loading and self-unloading. In one embodiment, a self-loading vehicle for loading a pallet in a loading position and transporting the pallet in a transporting position is provided, the vehicle comprising a front frame, the front frame including a pair of rearward extending pallet forks, a rear frame, the rear frame including a pair of forward extending beams, each beam configured to releasably accept a distal region of the pallet fork, a total of three or four driving wheels, each of the front frame and the rear frame rotatably retaining an at least one driving wheel, an at least one seat mounted on the front frame, a drive mechanism for propelling the vehicle, a steering mechanism located on the front frame for steering the vehicle, a braking mechanism for stopping the vehicle, a front lowering and raising mechanism attached to the front frame, a rear lowering and raising mechanism attached to the rear frame, a dolly wheel rotatably disposed in a vicinity of the distal region of each pallet fork, and a pair of dolly wheels rotatably disposed on each beam, such that in use, the front and rear frames are lowered and the front frame is detached from the rear frame in a loading position and the front and rear frames are raised and the front frame is attached to the rear frame in a traveling position.

In the self-loading vehicle the drive mechanism may be a drive train including an at least one sprocket, a pair of pedals, a pair of pedal cranks, a chain, and an at least one rear gear.

In the self-loading vehicle the front lowering and raising mechanism may be a linear actuator and the rear lowering and raising mechanism is a linear actuator pivotally mounted on the rear frame at a top end and pivotally mounted on at a lower end to a pivot arm, the pivot arm configured to rotate upwards or downwards.

In the self-loading vehicle the dolly wheels may be sized to contact the ground only in the loading position.

In the self-loading vehicle the steering mechanism may include a handlebar.

In the self-loading vehicle the braking system may be a hydraulic braking system including an at least one brake lever mounted on the handlebar.

In the self-loading vehicle, the front frame and the rear frame may define a loading zone, the loading zone about 48 inches to about 54 inches long.

The self-loading vehicle may comprise a locking mechanism to lock the pallet fork to the beam in the transporting position and to unlock the pallet fork from the beam to allow extraction of the fork from the beam to provide the loading position.

In the self-loading vehicle, the front frame and the rear frame may be constructed of steel to carry up to about 2,000 pounds.

In the self-loading vehicle the front and rear frames may be tubular steel.

In the self-loading vehicle the vehicle may be a tricycle having two wheels on the front frame and one wheel on the rear frame.

In the self-loading vehicle the vehicle may be a tricycle having one wheel on the front frame and two wheels on the rear frame.

In another embodiment, a self-loading, human-powered pallet carrier is provided, the pallet carrier comprising: a first frame; a second frame; a first linear actuator; a second linear actuator; a drive train; a handlebar; a seat; and a braking system, one of the first frame or the second frame supported by a pair of driving wheels, the other of the first frame or the second frame supported by a single driving wheel, one of the pair of driving wheels or the single driving wheel pivotally mounted to the second frame with the first actuator, the other of the pair of driving wheels or the single driving wheel mounted to the first frame, the first frame including a pair of pallet forks, the pallet forks attached to the second linear actuator, the second frame including a pair of beams, which, when mated, form a pallet loading zone, each pallet fork and each beam having an at least one dolly wheel, the drive train, the handlebar, the seat and the braking system mounted on the first frame.

The self-loading, human powered pallet carrier further comprises an electric power assist system for assisting in propelling the carrier.

In the self-loading, human powered pallet carrier the first frame may be a front frame and the second frame may be a rear frame.

The self-loading, human powered pallet carrier may further comprise a locking mechanism to lock the beams to the pallet forks.

In the self-loading, human powered pallet carrier the rear frame may include a pivot arm, the pivot arm rotatably attached to the actuator, and configured to rotate upwards or downwards.

In the self-loading, human powered pallet carrier, the pallet loading zone may be about 48 inches to about 54 inches long.

In yet another embodiment, a method of loading a pallet using a self-loading pallet carrier is provided, the self-loading pallet carrier including: a first frame; a second frame; a first linear actuator; a second linear actuator; a drive train; a handlebar; a seat; and a braking system, one of the first frame or the second frame supported by a pair of driving wheels, the other of the first frame or the second frame supported by a single driving wheel, one of the pair of driving wheels or the single driving wheel pivotally mounted to the second frame with the first actuator, the other of the pair of driving wheels or the single driving wheel mounted to the first frame, the first frame including a pair of pallet forks, the pallet forks attached to the second linear actuator, the second frame including a pair of beams, which, when mated, form a pallet loading zone, each pallet fork and each beam having an at least one dolly wheel, the drive train, the handlebar, the seat and the braking system mounted on the first frame, the method comprising: lowering the carrier to a loading position, thereby engaging the dolly wheels; releasing the mating pairs; aligning the pallet forks with the pallet; driving the first frame to locate the pallet forks in the pallet; mating the mating pairs; and actuating the linear actuators to raise the carrier from the loading position into a transporting position.

The method may further comprise transporting the pallet by driving the carrier.

The method may further comprise removing the pallet by lowering the carrier from the transporting position to the loading position, such that the dolly wheels are engaged, releasing the mating pairs and driving the first frame away from the pallet.

FIGURES

FIG. 7A shows how the tricycle of FIG. 1A is raised with the front and rear hydraulic rams, and FIG. 7B shows how the tricycle of FIG. 1A is lowered with the front and rear hydraulic rams.

FIG. 8 shows a rear perspective view the tricycle of FIG. 1A with a pallet loaded for transporting.

FIG. 9 shows a perspective view of an alternative embodiment of the tricycle described herein.

DESCRIPTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, The terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1A:
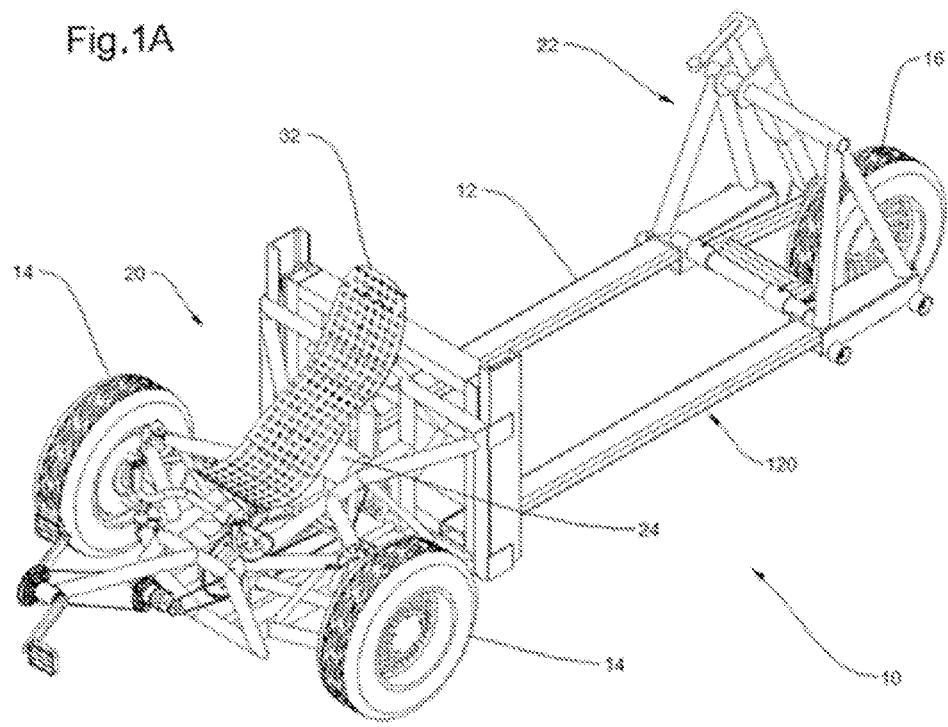
FIG. 1A is a perspective view of the tricycle of the present technology.
Figure 1B:
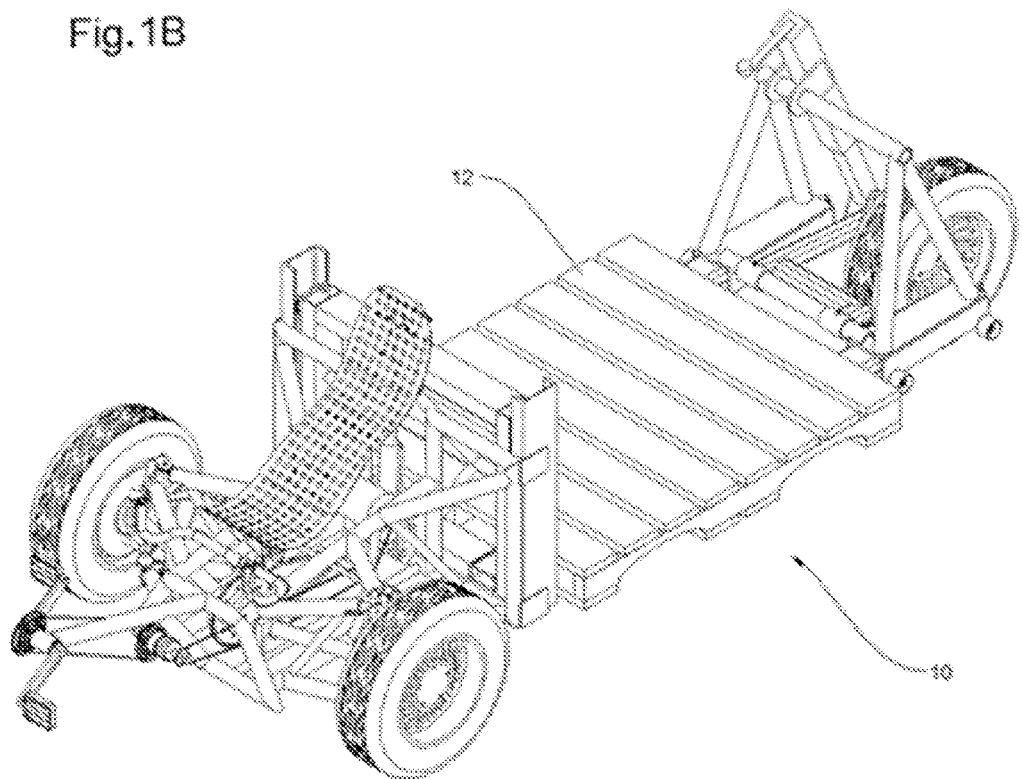
FIG. 1B is a perspective view of the tricycle of the present technology with a pallet loaded on the loading zone.

A tricycle pallet carrier, generally referred to as 10 is shown in FIG. 1A. There are two front driving wheels 14 and one rear driving wheel 16. A front frame, generally referred to as 20 is slidably connected to a rear frame, generally referred to as 22. The front driving wheels 14 are rotatably mounted on the front frame 20 and the rear driving wheel 16 is rotatably mounted indirectly on the rear frame 22. A standard axle is used to mount the front wheels 14 and a cantilever support is used to mount the rear wheel 16. The front driving wheels 14 articulate to allow for steering. A motor 24 provides electric assist to propel the tricycle 10. A seat 32 is mounted on the front frame 20. FIG. 1B shows the tricycle 10 is carrying a pallet 12. The pallet 12 is located between the front frame 20 and the rear frame 22.

Figure 2A:
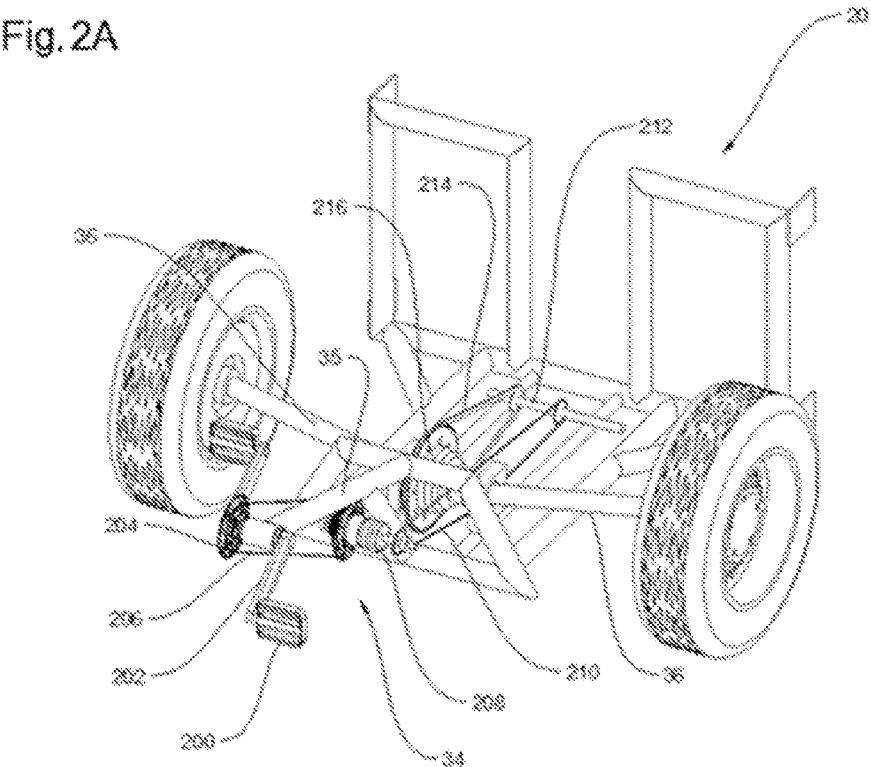
FIG. 2A is a perspective view of the front end of the tricycle of FIG. 1A showing one embodiment of the drive train.
Figure 2B:
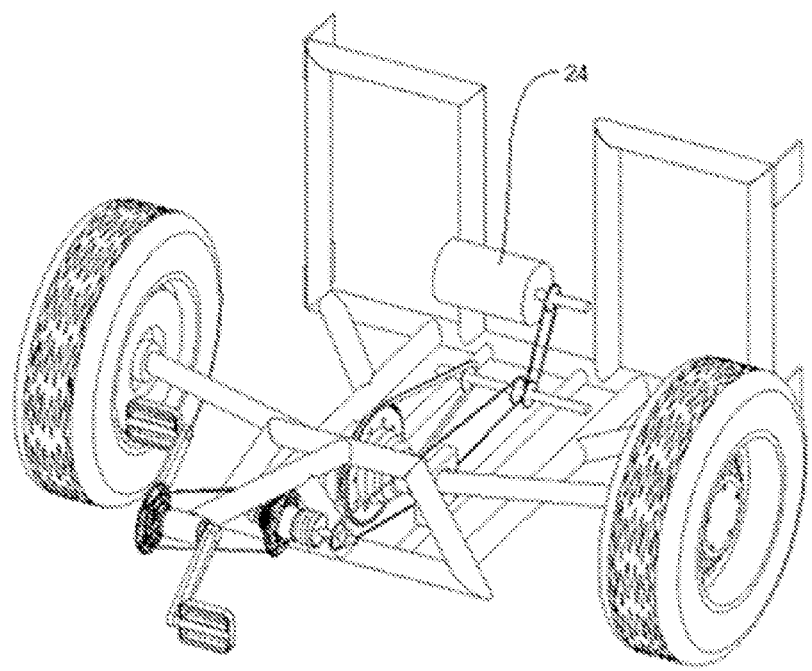
FIG. 2B is a perspective view of the front end of the tricycle of FIG. 1A showing a second embodiment of the drive train and FIG. 2C is a perspective view of the front end of the tricycle of FIG. 1A showing a third embodiment of the drive train.
Figure 2C:
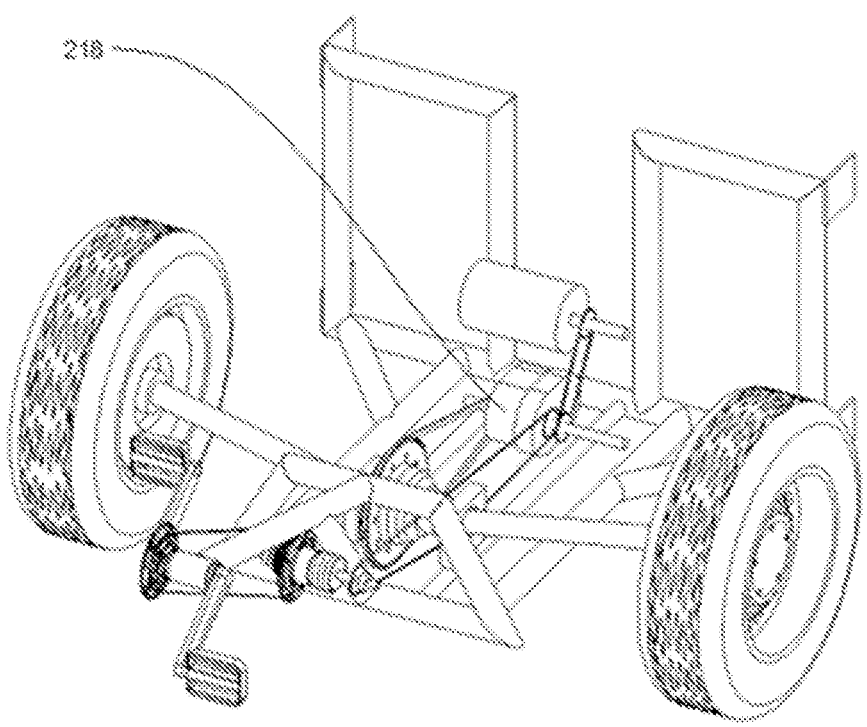

As shown in FIG. 2A a drive train, generally referred to as 34, includes pedals 200, pedal cranks 202, a front cog set or sprocket 204, a light duty first chain 206, a middle cog set 208 or single gear, a medium duty second chain 210, a rear cog set 212 or single gear, a heavy duty third chain 214, and a differential 216. The pedals 200 attach to the front cog set 204. The front cog set 204 is attached to a front member 35 that extends forward from the remainder of the front frame 20. The front cog set 204 drives the middle cog set 208 via the first chain 206 which in turn drives the rear cog set 212 via the second chain 210 which in turn drives the differential 216 via the third chain 214. Without being bound to theory, the combination of each chain section increases the mechanical advantage for the rider such that the weight of the tricycle may be propelled with average effort. The differential 216 is attached to the front axles 36. FIG. 2B is a further embodiment of FIG. 2A and includes the motor 24 to provide electric assist to propel the tricycle. FIG. 2C is a further embodiment of FIG. 2A and FIG. 2B and includes a transmission 218 which provides forward, neutral, and reverse operations to the drive train.

Figure 3:
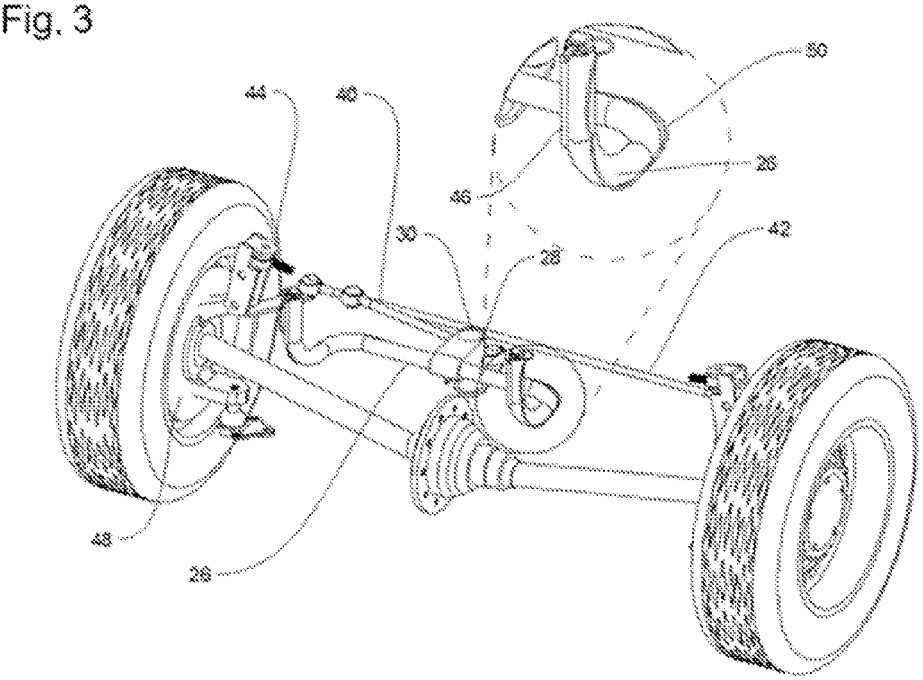
FIG. 3 is a perspective view of the steering mechanism and the braking mechanism of the tricycle of FIG. 1A.

As shown in FIG. 3, a handlebar 26 is attached to a steering column 28, which in turn is attached to a steering shaft 30. Translation of the rotation of the steering shaft 30 may be effected by a number of means, for example, but not limited to a lever as shown 40, or a rack and pinion mechanism. Tie rods 42 are attached to the lever mechanism 40 and the front axles 44. Brake levers 46 mounted on the handlebars 26 control the brakes 48. The brakes 48 are preferably hydraulic brakes, and hence hydraulic lines 50 extend between and are attached to the brake levers 46 and the brakes 48. As would be known to one skilled in the art, the brake calipers are actuated by the hydraulics, causing the brake pads to close over the brake disc.

Figure 4:
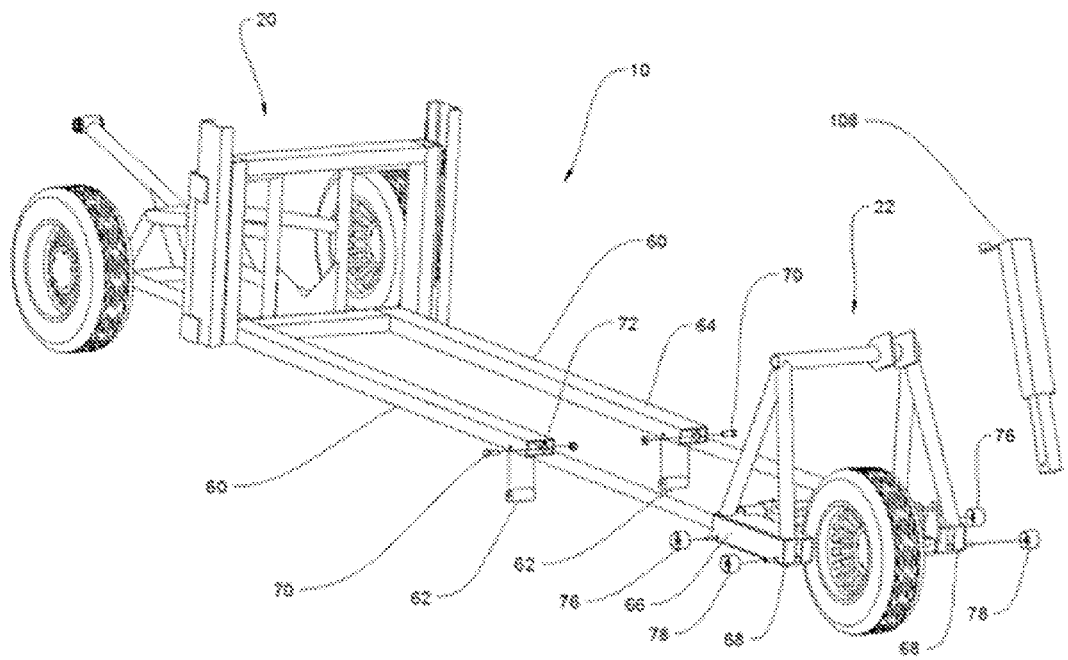
FIG. 4 is an exploded view of the frames of the tricycle of FIG. 1A.

As shown in FIG. 4, the front frame 20 has a pair of pallet forks 60 that extend rearward. The pallet forks have dolly wheels 62 in the vicinity of the distal region 64. As would be known to one skilled in the art, the pallet forks 60 are positioned to allow for picking up a pallet. The distal region 64 of the pallet forks 60 are sized to snugly mate with a pair of tubular beams 66 that form part of the rear frame 22. The tubular beams preferably decrease in inner diameter distally, to promote a snug fit. A locking mechanism, generally referred to as 68, retains the pallet forks 60 in the tubular beams 66. The locking mechanism 68 may be a pin 70 that passes through an aperture 72 in the tubular beam 66 and impinges on the pallet fork 60. Alternatively, it may be a pin 70 that passes through both the tubular beam 66 and the pallet fork 60 and is retained with a cotter pin 74. The beams 66 have a pair of proximal dolly wheels 76 and a pair of distal dolly wheels 78. The dolly wheels 62, 76, 78 are sized to be clear of the ground when the tricycle pallet carrier 10 is in the travelling position and to be on the ground in the loading position. This allows the carrier 10 to meet one of the requirements of being classified as a "bicycle", as there are only three points of contact while traveling.

Figure 5:
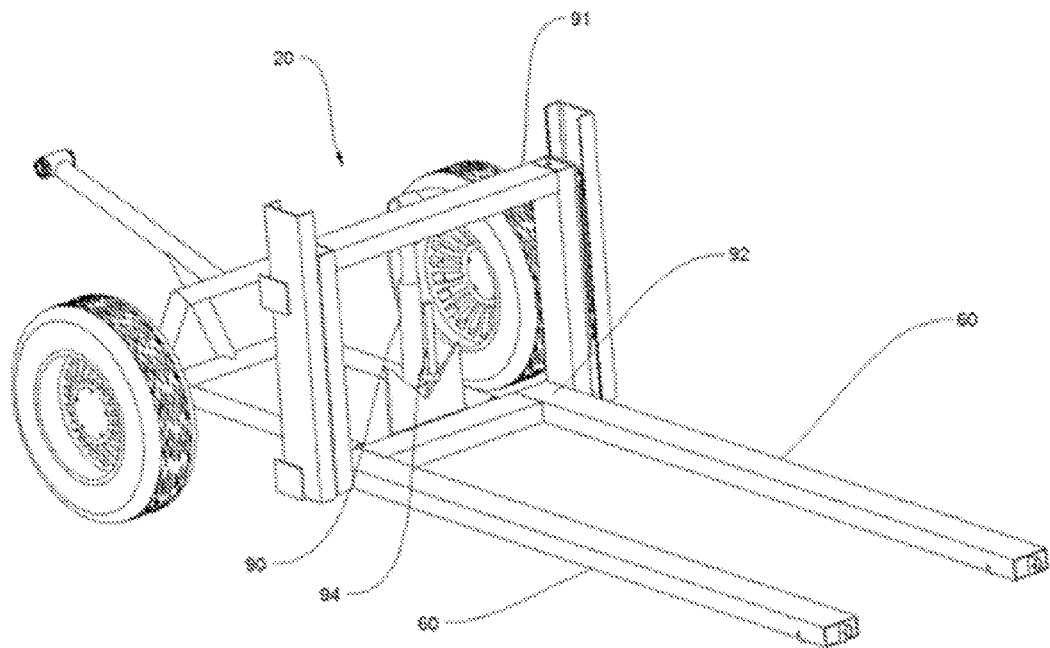
FIG. 5 is a rear perspective view of the lifting mechanism for the pallet forks.

As shown in FIG. 5, the front frame 20 retains a linear actuator, which in the preferred embodiment is a hydraulic ram 90. The hydraulic ram 90 is attached to a sliding carriage 91 which attaches to each pallet fork 60 at the proximal end 92. The ram 90 include an enabler 94, which is, for example, but not limited to, a pump arm for human-powered actuation or a motor.

Figure 6:
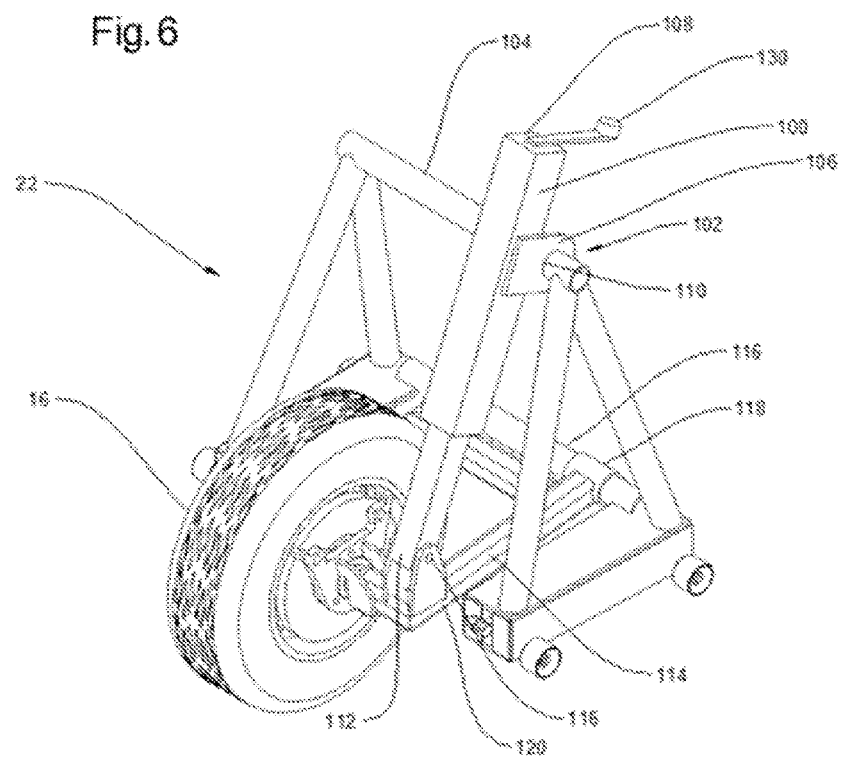
FIG. 6 is a rear perspective view of and lifting and pivoting mechanism for the rear wheel.

As shown in FIG. 6, the rear frame 22 pivotally retains a rear linear actuator, which in the preferred embodiment is a hydraulic ram 100. The pivot point, generally referred to as 102 is at the top horizontal member 104 of the rear frame 22. A bracket 106 is attached to the rear hydraulic ram 100 in the vicinity of the top of the ram 108. The bracket 106 is rotationally retained in the top horizontal member 104 via an aperture 110 in the bracket 106. The bottom end 112 of the rear hydraulic ram 100 is attached to a pivot arm 114. The pivot arm 114 is rotatably retained in a lower horizontal member 116, by rotatable retention in a lower aperture 118. The distal end 120 of the pivot arm 114 rotatably retains the rear driving wheel 16. The rear hydraulic ram 100 includes an enabler 130, which is, for example, but not limited to, a pump arm for human-powered actuation or a motor.

As shown in FIG. 7A, when the rear hydraulic ram 100 is extended, it urges pivot arm 114 to rotate sliding member 114 downwards, causing the rear driving wheel 16 to push against the ground. This lifts the rear frame 22. As shown in FIG. 7B, when the rear hydraulic ram 100 is retracted, it pulls the pivot arm 114 upwards, causing the rear driving wheel 16 to retract towards the rear frame 22. This lowers the rear frame 22 such that the caster wheels 76 and 78 contact the ground to support rear frame 22.

In an alternative embodiment, the tricycle is motor-driven with no pedals.

The tricycle 10 frames 20, 22 are made of tubular steel to permit loads of up to about 2,000 pounds. The frames provide a loading zone, generally referred to as 120 and shown in FIG. 1A of about up to about 54 inches, with the preferred loading zone being 48 inches or 50 inches for a 48 inch by 40 inch pallet. The widest part of the tricycle is the pallet, which is about 44 inches wide. In order to maximize stability, without increasing the width, the front wheels are up to about 44 inches apart, outside to outside. They are preferably no closer than about 32 inches apart, outside to outside. The wheels and tires are specified to each withstand at least 50% of the fully loaded tricycle. The loading zone can be configured for other pallet sizes, for example, pallets that are 42 inches by 42 inches would be better suited to a loading zone of about 45 inches, pallets that are 48 inches by 40 inches would be better suited to a loading zone of about 43 inches, pallets that are 44 inches by 44 inches would be better suited to a loading zone of about 47 inches, pallets that are 36 inches by 36 inches would be better suited to a loading zone of about 39 inches and so on.

A single wheel 14 or 16 in FIG. 1A or a combination of the wheels 14, 16 have brakes 48 attached such that the single action of a single brake or a combined action of all brakes 48 will bring the fully loaded tricycle 10 of FIG. 1A from a speed of 30 km/hr to a complete stop in less than 9 meters stopping distance.

When a pallet is to be loaded onto the tricycle, the rear frame 22 is disengaged from the front frame 20 as follows: First the hydraulic rams 90, 100 are actuated causing the frames 20, 22 to be lowered. Either one can be actuated first, or both can be actuated together. In the lowered position, the dolly wheels 62, 76, 78 are in contact with the ground. The locking mechanism 68 is then unlocked and the pallet forks 60 are slid out of the tubular beams 66. The dolly wheels 62, 76, 78 support the frames 20, 22 and allow them to be rolled away from one another. The rear frame 22 and the front frame 20 are now disengaged. This is the loading position. The user then positions the front frame 20 in front of a pallet, by propelling the front frame 20 on its dolly wheels 62 and then propels the front frame backwards so that the pallet forks 60 slide through the pallet. The user then positions, or has previously positioned the rear frame, again by rolling it on its dolly wheels 76, 78. A block is preferably placed behind the rear frame 22 to stop it from rolling away. The pallet forks 60 are urged into the tubular beams 66 and the locking mechanism 68 is locked. The hydraulic rams 90, 100 are then extended. This directly raises the pallet forks 60 and the loading zone 120. The dolly wheels 68, 76, 78 no longer contact the ground. This is the traveling position.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed. For example, the beams may be solid or have an inner truss or cross member or webbing design with a tubular portion at the front end for mating with the pallet forks. The present design has the user sitting as one would sit on a recumbent bike with the front member extending forwards from the remainder of the front frame to retain the sprockets. This could be changed to have the user more upright, with the sprockets essentially below the seat, as occurs in a standard bicycle. The single rear wheel could be replaced with two rear wheels and the two front wheels replaced with one front wheel to provide a total of three wheels.

The invention claimed is:

1. A human powered vehicle for loading a pallet in a loading position and transporting the pallet in a transporting position, the vehicle comprising: a front frame, the front frame including a pair of rearward extending pallet forks, a rear frame, the rear frame including a pair of forward extending beams, each beam configured to releasably accept a region of one of the pair of rearward extending pallet forks distal to the front frame, a total of three driving wheels, the front frame rotatably retaining two front driving wheels and the rear frame rotatably retaining one rear driving wheel, at least one seat mounted on the front frame, a drive mechanism for propelling the vehicle, a steering mechanism located on the front frame for steering the vehicle, a braking mechanism for stopping the vehicle, a front lowering and raising mechanism attached to the front frame, a rear lowering and raising mechanism attached to the rear frame, a dolly wheel rotatably disposed in a vicinity of the region of each pallet fork, and a pair of dolly wheels rotatably disposed on each beam, such that in use, the front and rear frames are lowered and the front frame is detached from the rear frame in a loading position and the front and rear frames are raised and the front frame is attached to the rear frame in a traveling position.

2. The human powered vehicle of claim 1, wherein the drive mechanism is a drive train including at least one sprocket, a pair of pedals, a pair of pedal cranks, a chain, and an at least one rear gear.

3. The human powered vehicle of claim 2, wherein the front lowering and raising mechanism is a linear actuator and the rear lowering and raising mechanism is a linear actuator, which is pivotally mounted at a top end to the rear frame and is pivotally mounted at a lower end to a pivot arm, the pivot arm configured to rotate upwards or downwards.

4. The human powered vehicle of claim 3, wherein the dolly wheels are sized to contact the ground only in the loading position.

5. The human powered vehicle of claim 4, wherein the steering mechanism includes a handlebar.

6. The human powered vehicle of claim 5, wherein the braking system is a hydraulic braking system including at least one brake lever mounted on the handlebar.

7. The human powered vehicle of claim 6 comprising a locking mechanism to lock the pallet fork to the beam in the transporting position and to unlock the pallet fork from the beam to allow extraction of the fork from the beam to provide the loading position.

8. The human powered vehicle of claim 1, wherein the front and rear frames define a loading zone, wherein the loading zone is about 48 inches to about 54 inches long.

9. The human powered vehicle of claim 8, wherein the front and rear frames are constructed of steel to carry up to about 2,000 pounds.

10. The human powered vehicle of claim 9 wherein the front and rear frames are tubular steel.

11. A pallet carrier operable to be powered by a human, the pallet carrier comprising: a front frame; a rear frame; a first linear actuator; a second linear actuator; a drive train; a handlebar; a seat; and a braking system, the front frame supported by a pair of front driving wheels, the rear frame supported by a rear driving wheel, the rear driving wheel pivotally mounted to the rear frame with the first actuator, the pair of front driving wheels mounted to the front frame, the front frame including a pair of pallet forks, the pallet forks attached to the second linear actuator, the rear frame including a pair of beams, which, when mated with the pair of pallet forks, together, form a pallet loading zone, each pallet fork and each beam having at least one dolly wheel, the drive train, the handlebar, the seat and the braking system mounted on the front frame.

12. The human powered pallet carrier of claim 11, further comprising an electric power assist system for assisting in propelling the carrier.

13. The human powered pallet carrier of claim 11 further comprising a locking mechanism to lock the beams to the pallet forks.

14. The human powered pallet carrier of claim 13 wherein the rear frame includes a pivot arm, the pivot arm rotatably attached to the actuator, and configured to rotate upwards or downwards.

15. The human powered pallet carrier of claim 14, wherein the pallet loading zone is about 48 inches to about 54 inches long.

16. A method of loading a pallet using a human powered pallet carrier, the pallet carrier including: a front frame; a rear frame; a first linear actuator; a second linear actuator; a drive train; a handlebar; a seat; and a braking system, the front frame supported by a pair of front driving wheels, the rear frame supported by a rear driving wheel, the rear driving wheel pivotally mounted to the rear frame with the first actuator, the pair of front driving wheels mounted to the front frame, the front frame including a pair of pallet forks, the pallet forks attached to the second linear actuator, the rear frame including a pair of beams, which, when mated with the pair of pallet forks, together, form a pallet loading zone, each pallet fork and each beam having at least one dolly wheel, the drive train, the handlebar, the seat and the braking system mounted on the front frame, the method comprising: lowering the carrier to a loading position, thereby engaging the dolly wheels; releasing each pallet fork from each beam; aligning the pallet forks with the pallet; driving the front frame to locate the pallet forks in the pallet; mating each pallet fork with each beam; and actuating the linear actuators to raise the carrier from the loading position into a transporting position.

17. The method of claim 16 further comprising transporting the pallet by driving the carrier.

18. The method of claim 17 further comprising removing the pallet by lowering the carrier from the transporting position to the loading position, such that the dolly wheels are engaged, releasing each pallet fork from each beam and driving the front frame away from the pallet.

\* \* \* \* \*